US012229184B2

United States Patent
Lee et al.

(10) Patent No.: US 12,229,184 B2
(45) Date of Patent: Feb. 18, 2025

(54) METHOD AND APPARATUS WITH INPUT DATA CLASSIFICATION

(71) Applicant: SAMSUNG ELECTRONICS CO., LTD., Suwon-si (KR)

(72) Inventors: Jaeyun Lee, Suwon-si (KR); Kyuhong Kim, Seoul (KR); Jiwhan Kim, Seongnam-si (KR); Sungun Park, Suwon-si (KR); Kiho Cho, Gunpo-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 494 days.

(21) Appl. No.: 17/569,914

(22) Filed: Jan. 6, 2022

(65) Prior Publication Data

US 2022/0318351 A1     Oct. 6, 2022

(30) Foreign Application Priority Data

Mar. 31, 2021    (KR) ......................... 10-2021-0041865
May 25, 2021    (KR) ......................... 10-2021-0066728

(51) Int. Cl.
*G06F 16/56*       (2019.01)
*G06F 16/55*       (2019.01)
*G06V 40/12*       (2022.01)

(52) U.S. Cl.
CPC ............. *G06F 16/56* (2019.01); *G06F 16/55* (2019.01); *G06V 40/1365* (2022.01); *G06V 40/1388* (2022.01)

(58) Field of Classification Search
CPC .......... G06F 16/56; G06F 16/55; G06F 21/32; G06V 40/1365; G06V 40/1388; G06V 40/1335
(Continued)

(56) References Cited

U.S. PATENT DOCUMENTS 5,719,950 A *   2/1998   Osten ..................... G06V 40/40
                                                                      340/5.82
8,812,431 B2     8/2014   Voigt et al.
(Continued)

FOREIGN PATENT DOCUMENTS

CN        109583966 B     4/2019
CN        111291782 A     6/2020
(Continued)

OTHER PUBLICATIONS

O. L. Frost, "An algorithm for linearly constrained adaptive array processing," in Proceedings of the IEEE, vol. 60, No. 8, pp. 926-935, Aug. 1972, doi: 10.1109/PROC.1972.8817.
(Continued)

*Primary Examiner* — Negussie Worku
(74) *Attorney, Agent, or Firm* — NSIP Law

(57) ABSTRACT

A processor-implemented method with input data classification includes: extracting an input embedding vector including a feature of biometric information of a user from input data including the biometric information; determining an adaptive embedding vector adaptive to the input embedding vector, based on a combination of a plurality of enrollment embedding vectors that are based on enrollment data; and classifying the input data based on a similarity between the input embedding vector and the adaptive embedding vector.

25 Claims, 14 Drawing Sheets

(58) Field of Classification Search
USPC .......................................................... 382/115
See application file for complete search history.

(56) References Cited

U.S. PATENT DOCUMENTS

| | | | |
|---|---|---|---|
| 10,262,188 B2 | 4/2019 | Agassy et al. | |
| 10,692,504 B2* | 6/2020 | Haughay | G10L 17/08 |
| 10,726,260 B2* | 7/2020 | Gottemukkula | G06V 40/50 |
| 11,394,552 B2* | 7/2022 | Streit | H04L 9/3226 |
| 11,574,499 B2* | 2/2023 | Cho | G06V 40/50 |
| 11,804,060 B1* | 10/2023 | Zhao | G06F 18/2415 |
| 2019/0251245 A1* | 8/2019 | Kim | G06F 21/40 |
| 2019/0278895 A1* | 9/2019 | Streit | G06N 3/08 |
| 2020/0125820 A1* | 4/2020 | Kim | G06N 20/10 |
| 2020/0134383 A1* | 4/2020 | Rhee | G06N 3/088 |
| 2021/0209207 A1* | 7/2021 | Lee | H04L 63/0861 |
| 2021/0279441 A1* | 9/2021 | Park | G06N 3/04 |
| 2021/0365666 A1* | 11/2021 | Cho | G06V 40/50 |
| 2022/0318354 A1* | 10/2022 | Park | G06V 40/1382 |
| 2022/0327189 A1* | 10/2022 | Belli | G06F 21/32 |
| 2023/0252283 A1* | 8/2023 | Lee | G06N 3/0464 |
| | | | 706/25 |

FOREIGN PATENT DOCUMENTS

| | | |
|---|---|---|
| CN | 111325245 A | 6/2020 |
| KR | 10-1436786 B1 | 9/2014 |

OTHER PUBLICATIONS

J. Chen, et al., "Nonnegative Least-Mean-Square Algorithm," in IEEE Transactions on Signal Processing, vol. 59, No. 11, pp. 5225-5235, Nov. 2011, doi: 10.1109/TSP.2011.2162508.

Platt, John C. "Fast embedding of sparse similarity graphs." Advances in neural information processing systems. 2004.

* cited by examiner

METHOD AND APPARATUS WITH INPUT DATA CLASSIFICATION

CROSS-REFERENCE TO RELATED APPLICATIONS

This application claims the benefit under 35 USC § 119(a) of Korean Patent Application No. 10-2021-0041865 filed on Mar. 31, 2021, and Korean Patent Application No. 10-2021-0066728 filed on May 25, 2021, in the Korean Intellectual Property Office, the entire disclosures of which are incorporated herein by reference for all purposes.

BACKGROUND

1. Field

The following description relates to a method and apparatus with input data classification.

2. Description of Related Art

Smartphones and various mobile and wearable devices may implement security authentication technology for biometric information. Since authentication through biometric information is convenient and easy to access, biometric authentication may be used. During the biometric authentication, biometric authentication may be performed based on a similarity between a feature vector of input data and an enrollment feature vector stored in an enrollment database, or whether input data is spoofed is determined. Here, an error may occur in calculating the similarity due to a sparsity caused by a high dimensionality of enrollment feature vectors and/or the number of enrollment feature vectors stored in the enrollment database. While this error may be reduced by reducing the dimensionality of the enrollment embedding vectors, such reduction in the dimensionality of the enrollment embedding vectors may reduce a capacity of generalization. Further, while this error also may be reduced by increasing the number of enrollment feature vectors in the enrollment database, such increase in the number of enrollment feature vectors in the enrollment database may lead to a physical limitation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with input data classification includes: extracting an input embedding vector including a feature of biometric information of a user from input data including the biometric information; determining an adaptive embedding vector adaptive to the input embedding vector, based on a combination of a plurality of enrollment embedding vectors that are based on enrollment data; and classifying the input data based on a similarity between the input embedding vector and the adaptive embedding vector.

The determining of the adaptive embedding vector may include: determining a combination embedding vector by combining enrollment embedding vectors adaptive to the input embedding vector among the plurality of enrollment embedding vectors; and generating the adaptive embedding vector by updating the combination embedding vector based on a loss function between the combination embedding vector and the input embedding vector.

The generating of the adaptive embedding vector may include generating the adaptive embedding vector by iteratively updating the combination embedding vector so that the loss function converges to a first value.

The determining of the combination embedding vector may include determining the combination embedding vector by combining the enrollment embedding vectors adaptive to the input embedding vector among the plurality of enrollment embedding vectors, through linear interpolation, and the generating of the adaptive embedding vector may include: updating the combination embedding vector by applying a weight for the linear interpolation to the combination embedding vector; and generating the adaptive embedding vector by updating the weight based on an error between the updated combination embedding vector and the input embedding vector.

The method may include receiving a hyperparameter indicating a degree to which the weight is updated, wherein the generating of the adaptive embedding vector may include: updating the weight by applying the hyperparameter to the error; and generating the adaptive embedding vector based on a loss function between the input embedding vector and the updated combination embedding vector to which the updated weight is applied.

The generating of the adaptive embedding vector may include generating the adaptive embedding vector by iteratively updating the weight so that the loss function between the input embedding vector and the updated combination embedding vector to which the updated weight is applied converges to a first value.

The method may include deriving a hyperparameter indicating a degree to which the weight is updated, using a power iteration algorithm, wherein the generating of the adaptive embedding vector may include generating the adaptive embedding vector by iteratively updating the weight by applying the hyperparameter to the error.

The deriving of the hyperparameter may include: determining a correlation matrix corresponding to the plurality of enrollment embedding vectors; and deriving the hyperparameter based on the correlation matrix.

The deriving of the hyperparameter based on the correlation matrix may include: determining an eigenvalue corresponding to the correlation matrix using the power iteration algorithm; and deriving the hyperparameter based on the eigenvalue.

The determining of the eigenvalue may include: determining an eigenvector corresponding to the correlation matrix using the power iteration algorithm; iteratively updating the eigenvector until the eigenvector converges; and determining the eigenvalue corresponding to the updated eigenvector.

The generating of the adaptive embedding vector by iteratively updating the weight may include: differently scheduling the hyperparameter each time the weight is iteratively updated; and generating the adaptive embedding vector by updating the weight by differently scheduled hyperparameters.

The classifying of the input data may include either one or both of: authenticating the input data based on the similarity; and determining whether the input data is spoofed based on the similarity.

In another general aspect, one or more embodiments include a non-transitory computer-readable storage medium storing instructions that, when executed by a processor, configure the processor to perform any one, any combination, or all operations and methods described herein.

In another general aspect, a processor-implemented method with input data classification includes: extracting an input embedding vector including a feature of biometric information of a user from input data including the biometric information; determining a combination embedding vector by combining enrollment embedding vectors adaptive to the input embedding vector among a plurality of enrollment embedding vectors included in a cluster based on enrolled images, through linear interpolation; determining an error between the input embedding vector and the combination embedding vector that is updated by applying a weight for the linear interpolation to the combination embedding vector; deriving a hyperparameter indicating a degree to which the weight is updated, based on a correlation matrix corresponding to the plurality of enrollment embedding vectors; generating an embedding vector adaptive to the input embedding vector by iteratively updating the weight by applying the hyperparameter to the error; and classifying whether the input data is spoofed based on a similarity between the input embedding vector and the adaptive embedding vector.

The generating of the adaptive embedding vector by iteratively updating the weight may include: differently scheduling the hyperparameter for each iteration at which the weight is iteratively updated; and generating the adaptive embedding vector by updating the weight by differently scheduled hyperparameters.

In another general aspect, an apparatus with input data classification includes: a sensor configured to capture input data including biometric information of a user; a memory configured to store a cluster including a plurality of enrollment embedding vectors that are based on enrollment data; and a processor configured to: extract an input embedding vector including a feature of the biometric information from the input data; determine an adaptive embedding vector adaptive to the input embedding vector, based on a combination of the plurality of enrollment embedding vectors; and classify the input data based on a similarity between the input embedding vector and the adaptive embedding vector.

For the determining of the adaptive embedding vector, the processor may be configured to: determine a combination embedding vector by combining enrollment embedding vectors adaptive to the input embedding vector among the plurality of enrollment embedding vectors; and generate the adaptive embedding vector by updating the combination embedding vector based on a loss function between the combination embedding vector and the input embedding vector.

For the generating of the adaptive embedding vector, the processor may be configured to generate the adaptive embedding vector by iteratively updating the combination embedding vector so that the loss function converges to a first value.

The processor may be configured to: for the determining of the combination embedding vector, determine the combination embedding vector by combining the enrollment embedding vectors adaptive to the input embedding vector among the plurality of enrollment embedding vectors, through linear interpolation; and for the generating of the adaptive embedding vector, update the combination embedding vector by applying a weight for the linear interpolation to the combination embedding vector; and generate the adaptive embedding vector by updating the weight based on an error between the updated combination embedding vector and the input embedding vector.

The processor may be configured to: derive a hyperparameter indicating a degree to which the weight is updated, based on a correlation matrix corresponding to the plurality of enrollment embedding vectors; and for the generating of the adaptive embedding vector, generate the adaptive embedding vector by iteratively updating the weight by applying the hyperparameter to the error.

In another general aspect, a processor-implemented method with input data classification includes: extracting an input embedding vector from input data including biometric information; determining a loss between the input embedding vector and a combination embedding vector generated by combining a plurality of enrollment embedding vectors; generating an adaptive embedding vector by updating the combination embedding vector until the loss converges to a predetermined value; and classifying the input data based on a similarity between the input embedding vector and the adaptive embedding vector.

The combination embedding vector may be a combination of the enrollment embedding vectors among a plurality of combinations of the enrollment embedding vectors.

The adaptive embedding vector may be the updated combination vector for which the loss converges to the predetermined value.

The method may include obtaining the biometric information using one or more sensors.

The method may include controlling access to one or more functions of an electronic apparatus based on a result of the classifying.

Other features and aspects will be apparent from the following detailed description, the drawings, and the claims.

BRIEF DESCRIPTION OF THE DRAWINGS

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Figure 1:
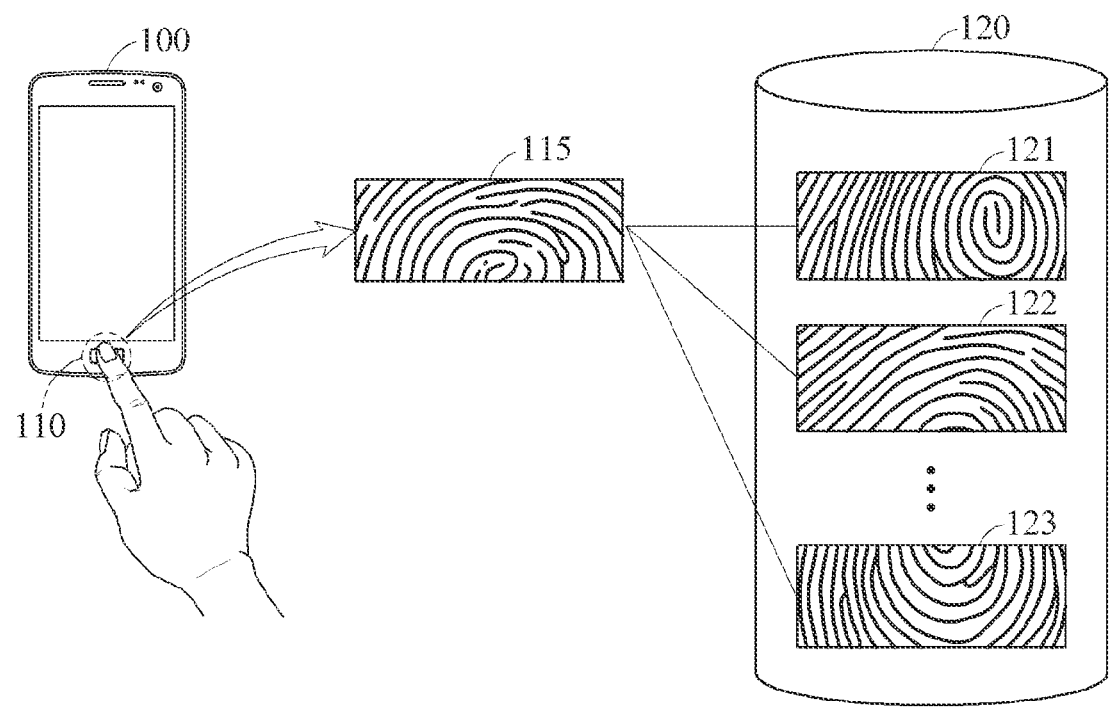
FIG. 1 illustrates an example of an environment for classifying input data.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, operations, operations, elements, and/or components, but do not preclude the presence or addition of one or more other features, integers, operations, operations, elements, components and/or groups thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein including technical or scientific terms have the same meaning as those generally understood consistent with and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an environment for detecting whether biometric information is spoofed. FIG. 1 illustrates a classification apparatus 100, and an enrollment fingerprint database (DB) 120 that includes enrolled fingerprint images 121, 122, and 123. The classification apparatus 100 may include a sensor 110 configured to sense biometric information (for example, a fingerprint) of a user. An example in which biometric information of a user is a fingerprint will be described below for convenience of description, however, examples are not limited thereto. The biometric information may include a variety of information (for example, an iris, lines of a palm, and/or a face) in addition to a fingerprint.

The classification apparatus 100 may obtain an input fingerprint image 115 representing a fingerprint of a user through the sensor 110. The sensor 110 may be, for example, an ultrasonic fingerprint sensor, an optical fingerprint sensor, an electrostatic fingerprint sensor, and/or an image sensor, which may capture a fingerprint of a user, but is not limited thereto. The classification apparatus 100 may be or include any of a personal computer (PC), a laptop computer, a tablet PC, a smartphone, a television (TV), a smart home appliance, an intelligent vehicle, a kiosk, and a wearable device, as non-limiting examples.

Fingerprint enrollment for fingerprint recognition may be performed. The enrolled fingerprint images 121, 122, and 123 may be stored in advance in the enrolled fingerprint DB 120 through a fingerprint enrollment process. For personal information protection, the enrollment fingerprint DB 120 may store features extracted from the enrolled fingerprint images 121, 122, and 123, instead of storing the enrolled fingerprint images 121, 122, and 123 without a change. The enrollment fingerprint DB 120 may be stored in a memory included in the classification apparatus 100, or in an external device such as a server or a local cache that may communicate with the classification apparatus 100.

When the input fingerprint image 115 for authentication is received, the classification apparatus 100 may detect whether the input fingerprint image 115 is spoofed and/or may perform authentication of the user corresponding to the input fingerprint image 115, based on a similarity between the fingerprint (hereinafter, referred to as an "input fingerprint") represented in the input fingerprint image 115 and enrolled fingerprints represented in the enrolled fingerprint images 121 to 123. The term "spoofing" used herein may indicate fake biometric information, instead of live biometric information, and may be construed as including, for example, duplication, forgery, and falsification of biometric information.

The classification apparatus 100 may determine whether an input fingerprint is authenticated and/or whether the input fingerprint is spoofed, based on a plurality of unspecified real fingerprint features provided in advance, a plurality of unspecified fake fingerprint features provided in advance, and/or enrolled fingerprint features of a device user, which will be further described below. Further, the classification apparatus 100 may control access to one or more functions of the classification apparatus 100, based on a result of the determining of whether the input fingerprint is authenticated and/or whether the input fingerprint is spoofed.

Figure 2:
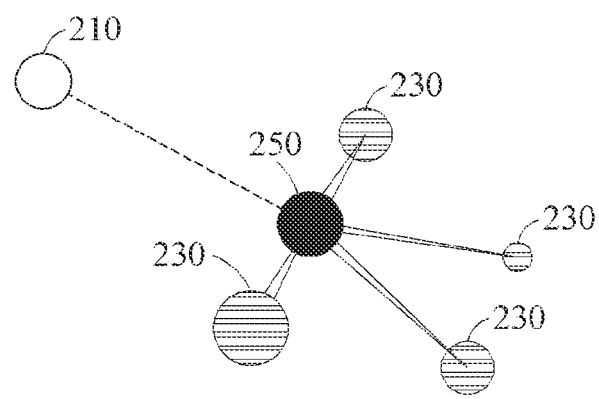
FIG. 2 three-dimensionally illustrates an example of a relationship between an embedding vector combined from embedding vectors that attempt enrollment and an input embedding vector that attempts authentication.

FIG. 2 three-dimensionally illustrates an example of a relationship between an embedding vector combined from embedding vectors that attempt enrollment and an input embedding vector that attempts authentication. FIG. 2 illustrates an input embedding vector 210, enrollment embedding vectors 230 in an embedding cluster, and an embedding vector 250 (hereinafter, referred to as an "adaptive embedding vector") that is adaptive to the input embedding vector 210 and that is determined by a combination of the enrollment embedding vectors 230.

For example, a plurality of enrollment embedding vectors 230 included in the embedding cluster based on enrollment data may be sparsely arranged. In this example, a similarity between the input embedding vector 210 and an enrollment embedding vector nearest to the input embedding vector 210 in the embedding cluster, or a similarity between the input embedding vector 210 and a statistically representative embedding vector (for example, an average value of the enrollment embedding vectors 230 included in the embedding cluster), may indicate a result different from an actual similarity.

In the similarity between the input embedding vector 210 and the nearest enrollment embedding vector, a blind spot may be caused by a sparse distribution of enrollment embedding vectors in an embedding space 200. In addition, the similarity between the input embedding vector 210 and the statistically representative embedding vector may dilute the meaning of individual enrollment embedding vectors in the embedding cluster.

In an example, by determining the adaptive embedding vector 250 adaptive to the input embedding vector 210 through a combination of the plurality of enrollment embedding vectors 230, the blind spot in the embedding space 200 may be eliminated and dilution of the meaning of individual embedding vectors may be prevented. In this example, the "adaptive embedding vector" 250 may correspond to an embedding vector most similar to the input embedding vector 210 among combinations of the enrollment embedding vectors 230 in the embedding cluster. In addition, a combination of embedding vectors similar to the input embedding vector 210 among the combinations of the enrollment embedding vectors 230 may be referred to as a "combination embedding vector". Combination embedding vectors may correspond to candidates of the adaptive embedding vector 250. For example, a finally determined combination embedding vector among combination embedding vectors may be the adaptive embedding vector 250. When only one combination embedding vector is provided, the combination embedding vector may be the adaptive embedding vector 250.

In an example, physical sparsity in the embedding cluster may be resolved using a combination and/or interpolation of the enrollment embedding vectors 230 included in the embedding cluster. In this example, various examples may be provided according to a combination scheme of the enrollment embedding vectors 230. For example, when a combination embedding vector by an arbitrary combination f of the enrollment embedding vectors 230 is denoted by $\hat{x}^c$, an optimal combination $f^o$ to be obtained may be represented as shown in Equation 1 below, for example.

$$f^o = \text{armin}_f L(S(x^i, \hat{x}^c)) \quad \text{Equation 1}$$

In Equation 1, $x^i$ denotes the input embedding vector 210, and $\{x_i^c\}_{i=1,\ldots,N}$ denotes the enrollment embedding vectors 230 in the embedding cluster. The combination embedding vector may be represented by $\hat{x}^c = f(x_1^c, x_2^c, \ldots, x_N^c)$. $S(x,y)$ denotes a similarity between embedding vectors and x and y, and $L(S(.,.))$ denotes a loss function related to a similarity.

In an example, an appropriate similarity between the input embedding vector 210 and the enrollment embedding vectors 230 included in the embedding cluster may be obtained by finding the adaptive embedding vector 250 properly combined through a definition of a combination function f and a loss function between the input embedding vector $x^i$ 210 and the combination embedding vector $\hat{x}^c$ combined in the embedding cluster as shown in Equation 1.

Figure 3:
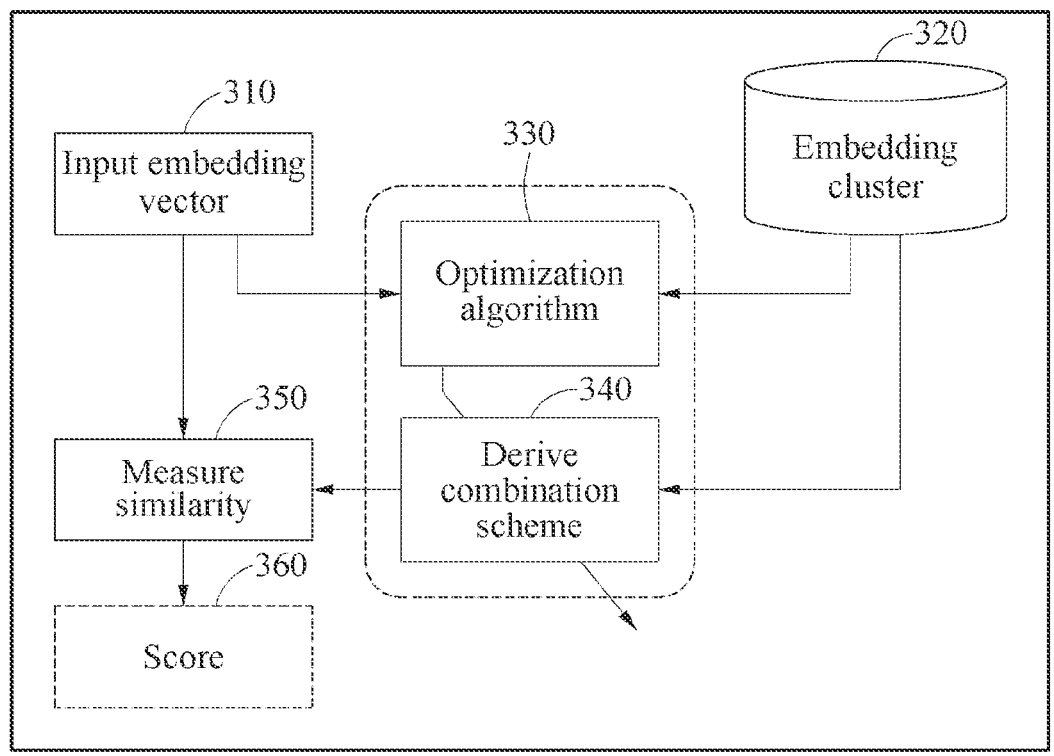
FIG. 3 is a diagram illustrating an example of a method of classifying input data.

FIG. 3 is a diagram illustrating an example of a method of classifying input data. FIG. 3 illustrates a process in which a classification apparatus measures a similarity between an input embedding vector 310 and enrollment embedding vectors included in an embedding cluster 320.

The classification apparatus may extract the input embedding vector 310 for input data using, for example, a deep neural network (DNN). The classification apparatus may use the input embedding vector 310 as an argument of an optimization algorithm 330 for optimizing a similarity measurement and a combination scheme. In this example, since the optimization algorithm 330 combines an embedding vector adaptive to an input embedding vector, the optimization algorithm 330 may also be referred to as an "adaptive algorithm".

The classification apparatus may convert enrollment data included in the embedding cluster 320 into enrollment embedding vectors, using the DNN. The enrollment embedding vectors may also be used as arguments of the optimization algorithm 330 and a combination scheme.

The classification apparatus may apply the optimization algorithm 330 to the input embedding vector 310 and the enrollment embedding vectors in the embedding cluster 320, and may derive an optimal combination scheme according to a result of applying the optimization algorithm 330 in operation 340. The classification apparatus may generate a combination embedding vector that may prevent an error from occurring in similarity calculation through a combination of embedding vectors that are clustered adaptively to an input embedding vector. Various non-limiting examples in which the classification apparatus applies the optimization algorithm 330 to the input embedding vector 310 and the enrollment embedding vectors in the embedding cluster 320 will be further described below with reference to FIGS. 6, 7, 9 and 11 below.

In operation 350, the classification apparatus may measure a similarity between the input embedding vector 310 and a combination embedding vector determined according to the derived optimal combination scheme. The classification apparatus may use the measured similarity without a change, or may convert the measured similarity into the form of a similarity score 360 and may use the similarity score 360. For example, the classification apparatus may detect or determine whether an input fingerprint image corresponding to the input embedding vector 310 is spoofed and/or may perform authentication of a user corresponding to the input fingerprint image, based on the similarity score 360.

In an example, the DNN may include a large number of artificial neurons connected by line-shaped edges. An artificial neuron may be referred to as a node. Artificial neurons may be interconnected through edges having connection weights. A connection weight may be a predetermined value of edges, and may be referred to as a "synaptic weight" or a "connection intensity". The DNN may include, for example, an input layer, a hidden layer, and an output layer.

Each of the input layer, the hidden layer, and the output layer may include a plurality of nodes. A node included in the input layer may be referred to as an "input node", a node included in the hidden layer may be referred to as a "hidden node", and a node included in the output layer may be referred to as an "output node". While the nodes and weights of the DNN may be respectively referred to as "artificial neurons" and "synaptic weights," such reference is not intended to impart any relatedness with respect to how the DNN architecture computationally maps or thereby intuitively recognizes information and how a human's neurons operate. I.e., the terms are merely terms of art referring to the hardware implemented nodes and weights of the DNN.

The input layer may receive an input for performing training or recognition and may transmit the input to the hidden layer. The output layer may generate an output of the DNN based on a signal received from the hidden layer. The hidden layer may be located between the input layer and the output layer, and may change a training input of training data received via the input layer to a value that is relatively easily predictable. Input nodes included in the input layer and hidden nodes included in the hidden layer may be connected to each other via connection lines having connection weights. Hidden nodes included in the hidden layer and output nodes included in the output layer may be connected to each other via connection lines having connection weights.

The classification apparatus may input outputs of previous hidden nodes included in a previous hidden layer to a corresponding hidden layer through connection lines having connection weights. The classification apparatus may generate outputs of hidden nodes included in the hidden layer, based on an activation function and values obtained by applying connection weights to outputs of previous hidden nodes. In an example, when a result of the activation function exceeds a threshold of a current hidden node, an output may be transmitted to a next hidden node. In this example, the current hidden node may remain in an inactive state, instead of transmitting a signal to the next hidden node until reaching a predetermined threshold activation strength through input vectors.

The classification apparatus may train the DNN through supervised learning. The classification apparatus may be implemented by, for example, a hardware module, or a combination thereof. The supervised learning may be a scheme of inputting, to the DNN, a training input of training data together with a training output corresponding to the training input and of updating connection weights of connection lines so that output data corresponding to the training output may be output. The training data may be data including a pair of a training input and a training output.

Figure 4:
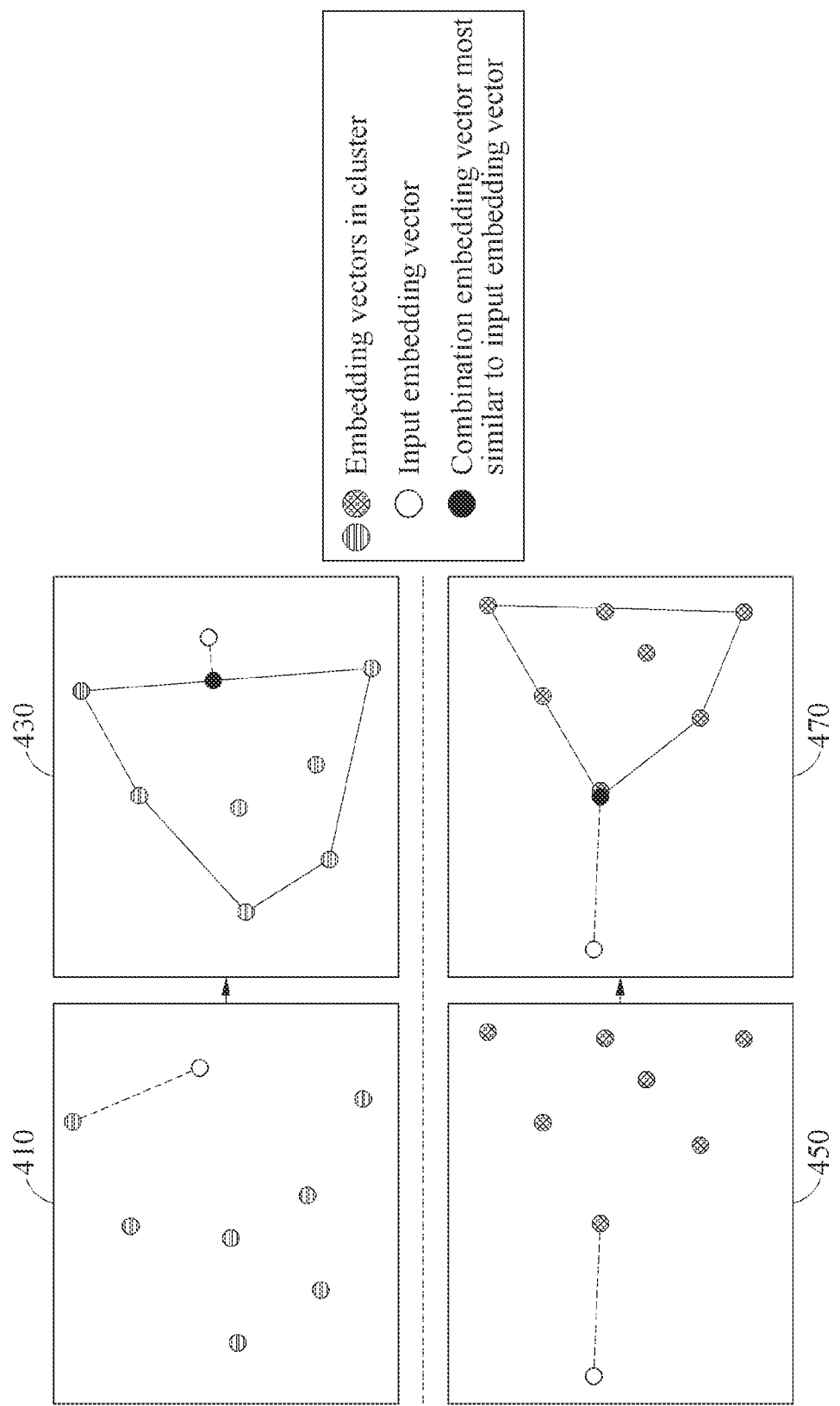
FIG. 4 illustrates an example of a generated combination embedding vector.

FIG. 4 illustrates an example of a generated combination embedding vector. In an example, a combination scheme may be linear interpolation on the assumption that a result obtained by performing linear interpolation on clustered embedding vectors is also similar to properties of embedding vectors included in an embedding cluster. In this example, the combination embedding vector corresponding to the clustered embedding vectors may indicate generating an embedding vector most similar to the input embedding vector among embedding vectors in a cluster. A combination embedding vector may be generated, for example, as shown in a box 430 or 470.

In an example, when the embedding vectors included in the embedding cluster are sparsely arranged, it may be difficult to calculate an appropriate similarity between the input embedding vector and each of the embedding vectors in the embedding cluster even though the input embedding vector is close to the embedding cluster in a distribution, as shown in a box 410 of FIG. 4. In this example, a classification apparatus may calculate an intended similarity to the embedding cluster by newly generating a combination embedding vector most similar to the input embedding vector, using linear interpolation in a corresponding embedding space, as shown in the box 430.

In another example, when the input embedding vector is very similar to a predetermined embedding vector x in the embedding cluster, as shown in the box 450, the classification apparatus may determine the predetermined embedding vector x, or an embedding vector very close to the predetermined embedding vector x as a combination embedding vector, as shown in the box 470. In this example, the classification apparatus may have the same result as selecting an embedding vector most similar to the input embedding vector from the embedding vectors included in the embedding cluster as a combination embedding vector.

Figure 5:
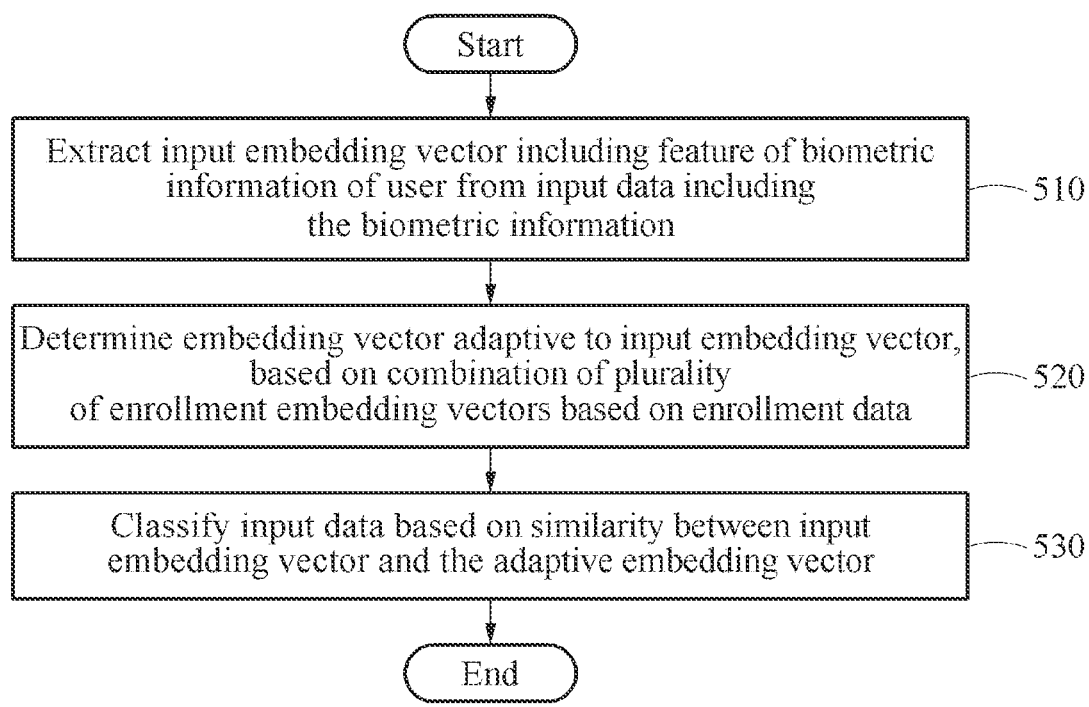
FIG. 5 is a flowchart illustrating an example of a method of classifying input data.

FIG. 5 is a flowchart illustrating an example of a method of classifying input data. In the following example, operations may be sequentially performed, but are not necessarily performed in a sequence. For example, the order of operations may be changed, and at least two operations may be performed in parallel.

FIG. 5 illustrates a process in which a classification apparatus classifies input data through operations 510 to 530.

In operation 510, the classification apparatus may extract an input embedding vector including a feature of biometric information of a user from input data including the biometric information. The input data may be, for example, image data or audio data, but is not necessarily limited thereto.

The classification apparatus may receive input data including biometric information sensed from a user by various sensors and may input the input data to a neural network that is configured to extract features of the biometric information. The neural network may be trained to extract a feature or a feature vector of the biometric information. The input embedding vector extracted by the neural network may include a feature (for example, a feature suitable for detecting whether biometric information is spoofed) of the biometric information, and an embedding vector may also be referred to as a "feature vector". The neural network may be, for example, a DNN, or a convolutional neural network (CNN), but is not limited thereto.

The sensors may include, for example, any one or any combination of an ultrasonic fingerprint sensor, an optical fingerprint sensor, an electrostatic fingerprint sensor, a depth sensor, an iris sensor, an image sensor, and a sound sensor, but are not limited thereto. One of the above sensors may be used, or two or more of the above sensors may also be used. The input data may be, for example, the input fingerprint image 115 of FIG. 1, an iris image, a face image, or an audio file.

In operation 520, the classification apparatus may determine an embedding vector adaptive to the input embedding vector based on a combination of a plurality of enrollment embedding vectors that are based on enrollment data. For example, the classification apparatus may determine the adaptive embedding vector using various combination schemes according to the optimization algorithm 330 described above with reference to FIG. 3. The adaptive embedding vector may correspond to a combination embedding vector that is most similar to the input embedding vector. Also, determining the embedding vector adaptive to the input embedding vector may indicate generating an embedding vector that may prevent an error from occurring in similarity calculation through a combination of embedding vectors that are clustered adaptively to an input embedding vector.

In operation 520, the classification apparatus may determine a combination embedding vector by combining enrollment embedding vectors adaptive to the input embedding vector among the plurality of enrollment embedding vectors. The classification apparatus may generate an embedding vector adaptive to the input embedding vector by updating the combination embedding vector based on a loss function between the combination embedding vector and the input embedding vector. The classification apparatus may determine a combination embedding vector that minimizes the loss function between the combination embedding vector and the input embedding vector as the adaptive embedding vector. Non-limiting examples of a method in which the classification apparatus determines an embedding vector adaptive to an input embedding vector using various combination schemes will be further described below with reference to FIGS. 6 to 11.

In operation 530, the classification apparatus may classify the input data based on a similarity between the input embedding vector extracted in operation 510 and the adaptive embedding vector determined in operation 520. For example, the classification apparatus may classify the input data by calculating a similarity between the combination embedding vector and the input embedding vector for an optimal combination that minimizes the loss function.

In operation 530, the classification apparatus may authenticate the input data or determine whether the input data is spoofed based on the similarity between the input embedding vector and the adaptive embedding vector. Further, in operation 530, the classification apparatus may control access to one or more functions of the classification apparatus, based on a result of the authenticating of the input data or the determining of whether the input data is spoofed.

Figure 6:
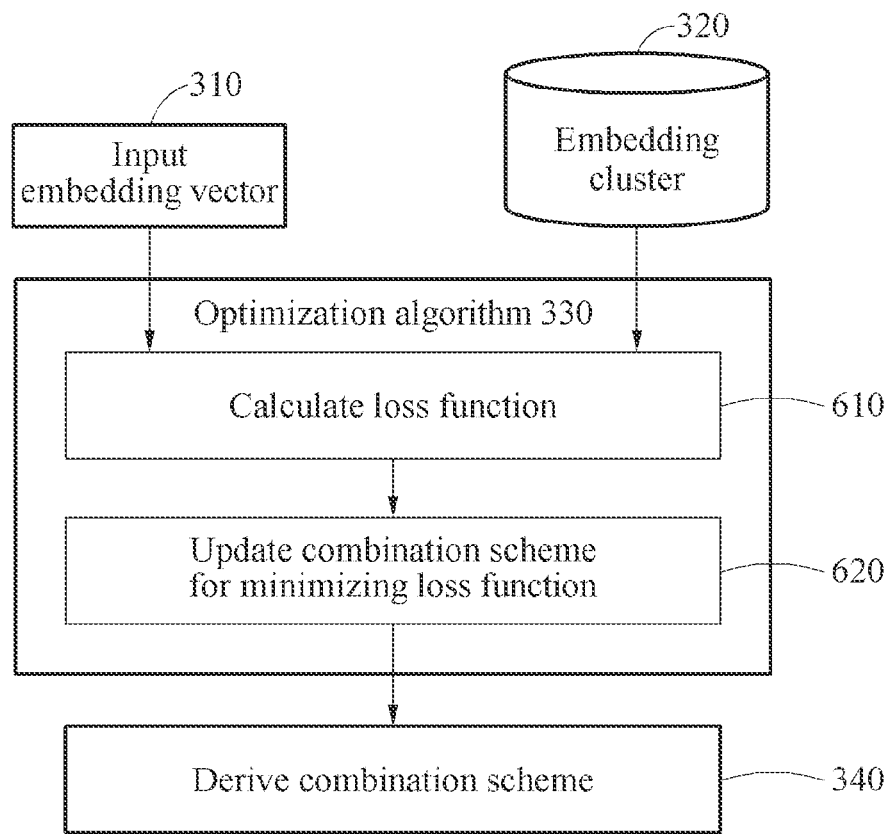
FIGS. 6 and 7 illustrate examples of a method of classifying input data.

FIG. 6 illustrates an example of a method of classifying input data. In the following example, operations may be sequentially performed, but are not necessarily performed in a sequence. For example, the order of operations may be changed, and at least two operations may be performed in parallel.

FIG. 6 illustrates a process in which a classification apparatus changes a combination scheme through operations 610 and 620 according to an optimization algorithm 330. As in FIG. 3, the optimization algorithm 330 may receive an input embedding vector 310 and enrollment embedding vectors included in an embedding cluster 320 to derive an optimal combination scheme in operation 340.

In operation 610, the classification apparatus may calculate a loss function defined between the input embedding vector 310 and the embedding cluster 320 according to the optimization algorithm 330. The loss function may be a loss function between the input embedding vector 310 and the enrollment embedding vectors included in the embedding cluster 320, or a loss function between the input embedding vector 310 and a primary combination of the enrollment embedding vectors in the embedding cluster 320 as shown in Equation 1 above. The primary combination may be different from the combination scheme derived in operation 340.

In operation 620, the classification apparatus may update an optimal combination scheme for minimizing the loss function calculated in operation 610. In an example, the classification apparatus may generate an embedding vector adaptive to the input embedding vector by iteratively updating the combination scheme. Non-limiting examples of a process in which the classification apparatus generates an adaptive embedding vector through iterative updates will be further described below with reference to FIGS. 7 and 8.

In another example, as described above, the classification apparatus may determine an embedding vector adaptive to the input embedding vector, using a result of linear interpolation performed between embedding vectors in an embedding cluster as a possible combination, based on the assumption that a result of the linear interpolation between the embedding vectors is similar to properties of the embedding cluster. Non-limiting examples of a method in which the classification apparatus determines an embedding vector adaptive to an input embedding vector through linear interpolation will be further described below with reference to FIGS. 9 and 12.

The classification apparatus may derive the finally updated combination scheme in operation 340 to determine the embedding vector adaptive to the input embedding vector.

Figure 7:
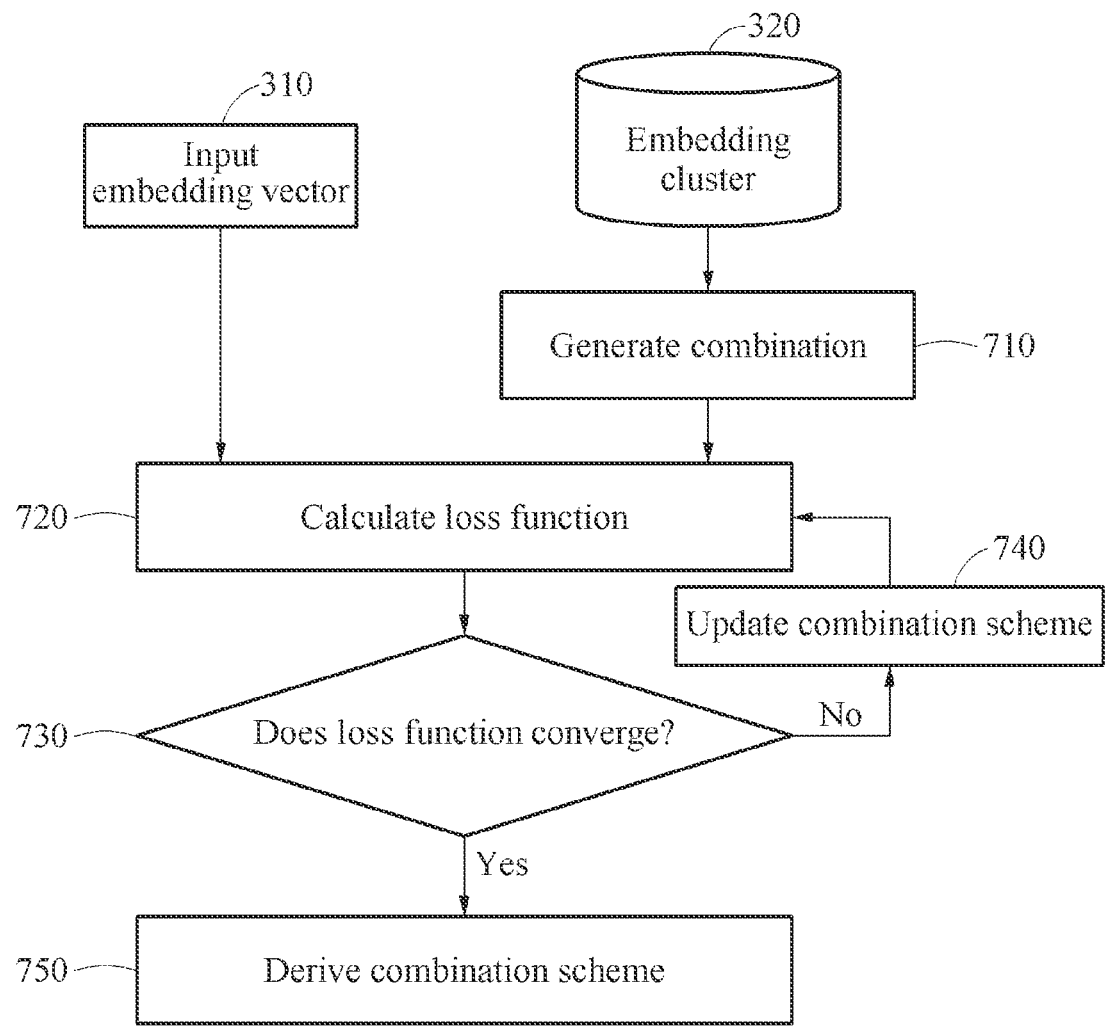

FIG. 7 illustrates an example of a method of classifying input data. In the following example, operations may be sequentially performed, but are not necessarily performed in a sequence. For example, the order of operations may be changed, and at least two operations may be performed in parallel.

FIG. 7 illustrates a process in which a classification apparatus derives a combination scheme for classification of input data through operations 710 to 750.

The classification apparatus may generate an embedding vector adaptive to an input embedding vector by iteratively updating a combination scheme, to realize an optimization algorithm. The classification apparatus may employ an iterative update scheme such that a loss function converges to a predetermined value, so as to have advantages in an amount of calculation, a calculation time, and memory usage, in comparison to a scheme of explicitly optimizing a loss function. The above iterative update scheme may also be applied to all application fields requiring a similarity to embedding vectors included in an embedding cluster.

In operation 710, the classification apparatus may initially generate a combination of enrollment embedding vectors included in an embedding cluster 320 by combining the enrollment embedding vectors.

In operation 720, the classification apparatus may calculate a loss function between an input embedding vector 310 and a combination embedding vector corresponding to the combination generated in operation 710. For example, the loss function may be defined between an input embedding vector and a combination embedding vector, as shown in Equation 1 described above.

In operation 730, the classification apparatus may determine whether the loss function calculated in operation 720 converges to a desired or predetermined value. For example, when the loss function is determined not to converge in operation 730, the classification apparatus may update a combination scheme so that the loss function may be stabilized to a desired or predetermined value, and may iteratively perform operations 720, 730, and 740 until a loss function between the input embedding vector 310 and embedding vectors combined according to the updated combination scheme converges to a first value (for example, "0").

In an example, when the loss function is determined not to converge in operation 730, the classification apparatus may update the combination scheme so that the loss function may converge to the first value (for example, "0") in operation 740, and may calculate a loss function between embedding vectors that are newly combined according to the updated combination scheme and the input embedding vector 310 in operation 720. In operation 730, the classification apparatus may determine whether the loss function between the newly combined embedding vectors and the input embedding vector 310 converges to the first value.

In another example, when the loss function is determined to converge in operation 730, the classification apparatus may derive a combination scheme used when the loss function converges in operation 750. In this example, the classification apparatus may classify input data based on a similarity between the input embedding vector 310 and an adaptive embedding vector determined according to the combination scheme derived in operation 750.

Figure 8:
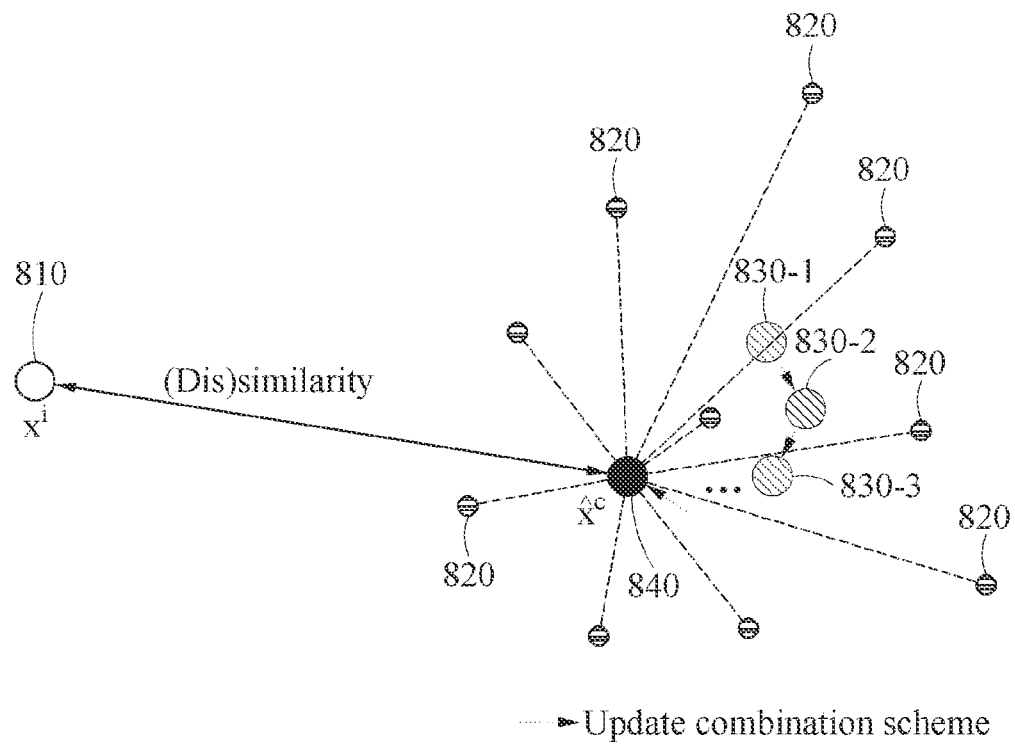
FIG. 8 illustrates an example of a process of updating a combination embedding vector.

FIG. 8 illustrates an example of a process of updating a combination embedding vector (e.g., a combination embedding vector of FIG. 7). FIG. 8 illustrates a process of iteratively updating a combination embedding vector corresponding to a combination of embedding vectors included in an embedding cluster.

A classification apparatus may initially generate a combination embedding vector 830-1 by combining enrollment embedding vectors 820 included in an embedding cluster.

The classification apparatus may calculate a loss function between an input embedding vector $x^i$ 810 and the combination embedding vector 830-1. When the loss function does not converge to a desired or predetermined value (for example, "0"), the classification apparatus may iteratively update a combination scheme, and may calculate a loss function between the input embedding vector 810 and a combination embedding vector 830-2 newly generated according to the updated combination scheme. When the loss function between the input embedding vector 810 and the combination embedding vector 830-2 does not converge to the desired or predetermined value, the classification apparatus may update the combination scheme again, and may calculate a loss function between the input embedding vector 810 and a combination embedding vector 830-3 newly generated according to the updated combination scheme. The classification apparatus may repeat the above-described process until a loss function converges to the desired or predetermined value.

When the loss function converges to the desired or predetermined value, the classification apparatus may determine a combination embedding vector (for example, a combination embedding vector $\hat{x}^c$ 840) generated according to a combination scheme used when the loss function converges, as an embedding vector adaptive to the input embedding vector 810.

Figure 9:
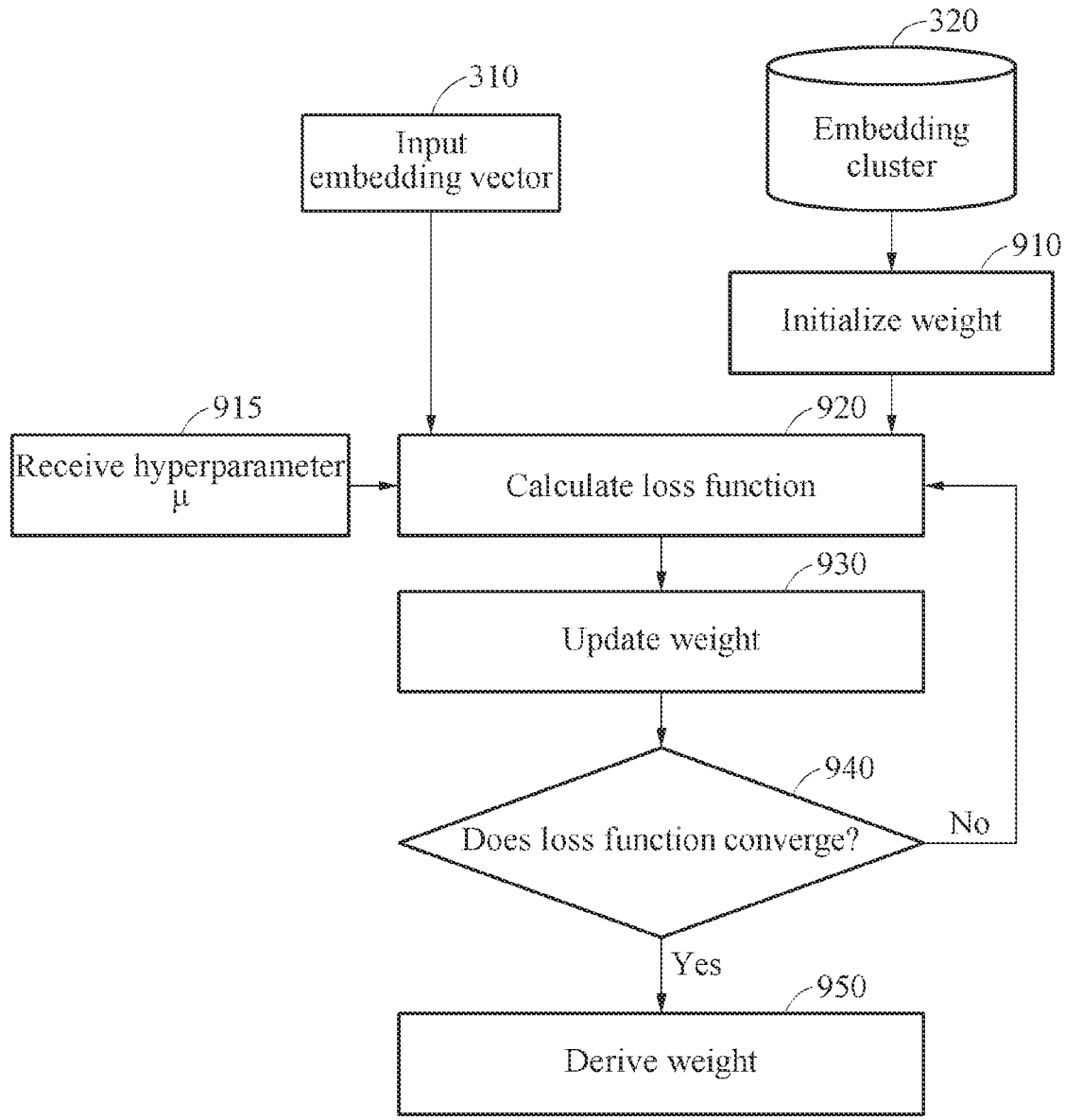
FIG. 9 illustrates an example of a method of classifying input data.

FIG. 9 illustrates an example of a method of classifying input data. In the following example, operations may be sequentially performed, but are not necessarily performed in a sequence. For example, the order of operations may be changed, and at least two operations may be performed in parallel.

For example, on the assumption that a result of linear interpolation between clustered embedding vectors is similar to properties of an embedding cluster, a classification apparatus may limit a combination scheme of enrollment embedding vectors included in an embedding cluster 320 to a linear interpolation scheme (for example, a convex combination), to express a process of deriving a combination scheme as a constrained optimization problem, as shown in Equation 2 below, for example.

$$f^O = \mathrm{argmin}_f L(S(x^i, \hat{x}^c)) \quad \text{Equation 2}$$

$$\hat{x}^c = f(x_1^c, x_2^c, \ldots, x_N^c)$$

$$= \sum_{i=1}^{N} w_i x_i^c$$

$$\sum_{i=1}^{N} w_i = 1, w_i \geq 0, \forall i$$

The constrained optimization problem of Equation 2 may be solved through an iterative process of FIG. 7, when a similarity between an input embedding vector 310 and a combination embedding vector (or an adaptive embedding vector) is a degree to which the input embedding vector 310 and the combination embedding vector are close in a Euclidean distance, and when the loss function of FIG. 7 is a Euclidean distance.

For example, the classification apparatus may mix a linearly-constrained least-mean square scheme and a non-negative least-mean-square scheme that is one of adaptive filtering schemes, and solve the constrained optimization problem by updating a weight was shown in Equation 3 below, for example.

$$\tilde{w}_{k+1} = P[w_k + \mu Ve] + F$$

$$\tilde{w}_i = 0, \text{ if } w_i < 0$$

$$w_i = \tilde{w}_i / \Sigma_{i=1}^{N} \tilde{w}_i$$

In Equation 3, $$w = [w_1, w_2, \ldots, w_N]^T,$$

$$P = I - \frac{1}{N} 11^T, \text{ and}$$

$$F = \frac{1}{N} 1$$

may be satisfied. Also, $1=[1, 1, \ldots, 1]^T \in \mathbb{R}^N$, $V=[x_1^c, x_2^c, \ldots, x_N^c]^T$, and $e = x^i - V^T w$ may be satisfied.

µ denotes a step-size, that is, a hyperparameter indicating a degree to which a weight is updated at one time. In addition, k denotes a number of iterations of weight updates, and I denotes an identity matrix.

Hereinafter, a derivation process of Equation 3 is described below.

For example, an embedding vector $x^o$ (or an embedding vector adaptive to an input embedding vector) optimally combined by the linearity-constrained least-mean square scheme may be expressed as shown in Equation 4 below, for example.

$$x^O = \mathrm{argmin}_{x^i} \| x^i - Vw \|^2 \quad \text{Equation 4}$$

subject to $C^T w = f$ and $w \geq 0$

In an example of a linear constraint, a slope for a weight w at optimal points using a Lagrange multiplier λ may need to be "0", which may be expressed as shown in Equation 5 below, for example.

$$\mathrm{grad} = 2V^T V w = 2V^T x + \lambda C \quad \text{Equation 5}$$

Here, weight update may be expressed as shown in Equation 6 below, for example.

$$w(k+1) = w(k) - \mu grad$$
$$= w(k) - \mu(V^T V w - V^T x + \lambda C)$$
$$= w(k) - \mu(V^T e + \lambda C)$$

Equation 6

To update a weight, a constraint $C^T w = f$ may need to be satisfied, and when the constraint $C^T w = f$ is applied, Equation 6 may be expressed as Equation 7 shown below, for example.

$$f = C^T w(k+1) = C^T w(k) - \mu C^T (V^T e + \lambda C)$$

Equation 7

When a result $\lambda$ is replaced with Equation 6, Equation 7 may be expressed as Equation 8 shown below, for example.

$$w(k+1) = P[w(k) - \mu V^T e] + F$$

Equation 8

Here, $P = I - C(C^T C)^{-1} C^T$, $F = C(C^T C)^{-1} f$ may be satisfied.

For example, a weighted non-negative least-mean-square scheme may be performed sensitively according to the step-size. For example, Equation 9 shown below may not operate due to a gradient exaggeration by diag(w(k)).

$$w(k+1) = P[w(k) + \mu diag(w(k)) V^T e] + F$$

Equation 9

In Equation 9, diag(•) denotes a diagonal matrix in which diagonal elements correspond to an argument.

Equation 9 may be expressed as Equation 3 described above, according to a greedy way. In Equation 3, weights and linear constraints may be explicitly maintained.

The combination scheme may be updated by the weight w updated through Equation 3, and accordingly a combination embedding vector determined by combining the enrollment embedding vectors included in the embedding cluster may also be updated.

In an example, to guarantee non-negativity of a weight when the weight is updated, Equation 9 may be modified to be Equation 3 and used.

diag(w(k)) in Equation 9 may function to avoid negativity, but may cause an error in a positive weight and may be weak in terms of a hyperparameter sensitivity. Thus, in Equation 3, a negative weight may be substituted with "0".

Accordingly, the constraint of Equation 2 may be affected, and thus the classification apparatus may update the combination embedding vector by additionally updating $w_i = \tilde{w}_i / \sum_{i=1}^{N} \tilde{w}_i$ in Equation 3.

FIG. 9 illustrates a process in which the classification apparatus derives a weight for classification of input data through operations 910 to 960.

In operation 910, the classification apparatus may initialize a weight for linear interpolation. For example, the classification apparatus may determine a combination embedding vector by combining enrollment embedding vectors adaptive to an input embedding vector among a plurality of enrollment embedding vectors by linear interpolation, for example, a convex combination. The classification apparatus may update the combination embedding vector by applying the weight to the combination embedding vector.

In operation 915, the classification apparatus may receive a hyperparameter indicating a degree to which the weight is updated.

In operation 920, the classification apparatus may calculate an error between the updated combination embedding vector and the input embedding vector 310.

In operation 930, the classification apparatus may update the weight by applying the hyperparameter received in operation 915 to the error calculated in operation 920.

The classification apparatus may generate an embedding vector adaptive to the input embedding vector based on a loss function between the updated combination embedding vector to which the updated weight is applied and the input embedding vector.

For example, in operation 940, the classification apparatus may determine whether a loss function between the input embedding vector and the updated combination embedding vector to which the weight updated in operation 930 is applied converges to a desired value (for example, a first value). The classification apparatus may calculate an error between the updated combination embedding vector and the input embedding vector until the loss function converges to the desired value. In an example, when the loss function is determined not to converge to the first value in operation 940, the classification apparatus may determine the weight through a process of iteratively updating the weight through operations 920 to 940 so that the loss function may converge to the first value.

In another example, when the loss function is determined to converge to the first value in operation 940, the classification apparatus may derive a weight finally determined so that the loss function converges in operation 950.

The classification apparatus may determine a combination embedding vector corresponding to the weight derived in operation 950 as an embedding vector adaptive to the input embedding vector, and may classify the input data based on a similarity between the input embedding vector and the adaptive embedding vector.

Figure 10:
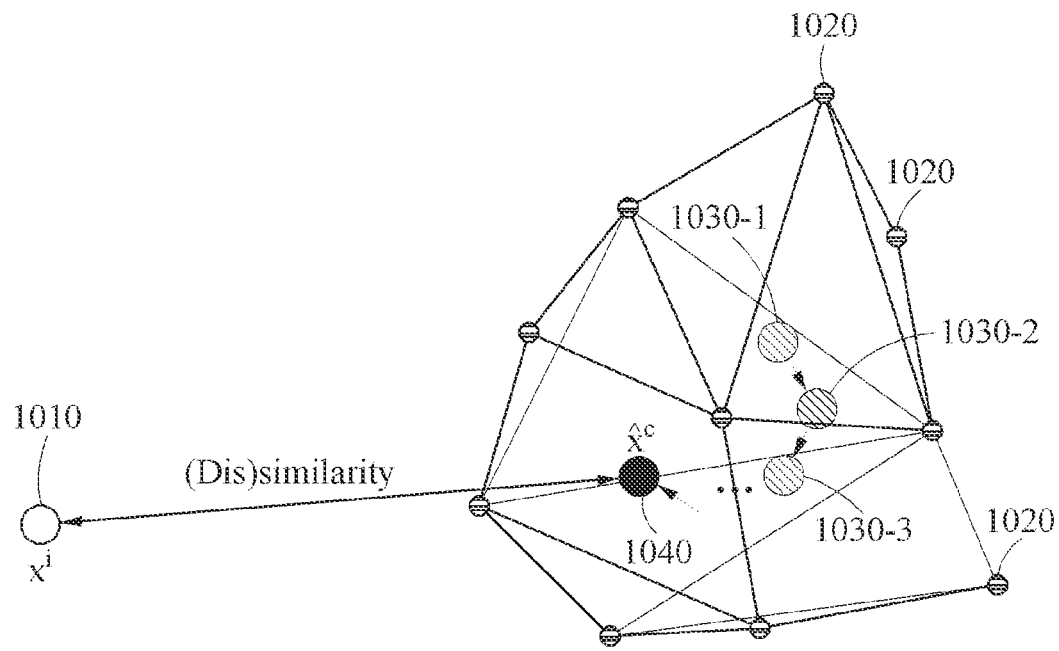
FIG. 10 illustrates an example of a process of updating a combination embedding vector.

FIG. 10 illustrates an example of a process of updating a combination embedding vector (e.g., a combination embedding vector of FIG. 9). FIG. 10 illustrates a process of iteratively updating a combination embedding vector determined by combining enrollment embedding vectors 1020 included in an embedding cluster when a combination of the enrollment embedding vectors 1020 is linear interpolation.

As described above with reference to FIG. 9, a classification apparatus may calculate an error e between an input embedding vector 1010 and combination embedding vectors 1030-1, 1030-2, and 1030-3 updated until a loss function converges to a desired value. For example, the classification apparatus may determine a weight through a process of iteratively updating weights based on the error as in Equation 9 described above.

The classification apparatus may determine the combination embedding vectors 1030-1, 1030-2, and 1030-3 iteratively updated by applying a weight for linear interpolation to the combination embedding vectors to generate an embedding vector 1040 adaptive to the input embedding vector 1010.

Figure 11:
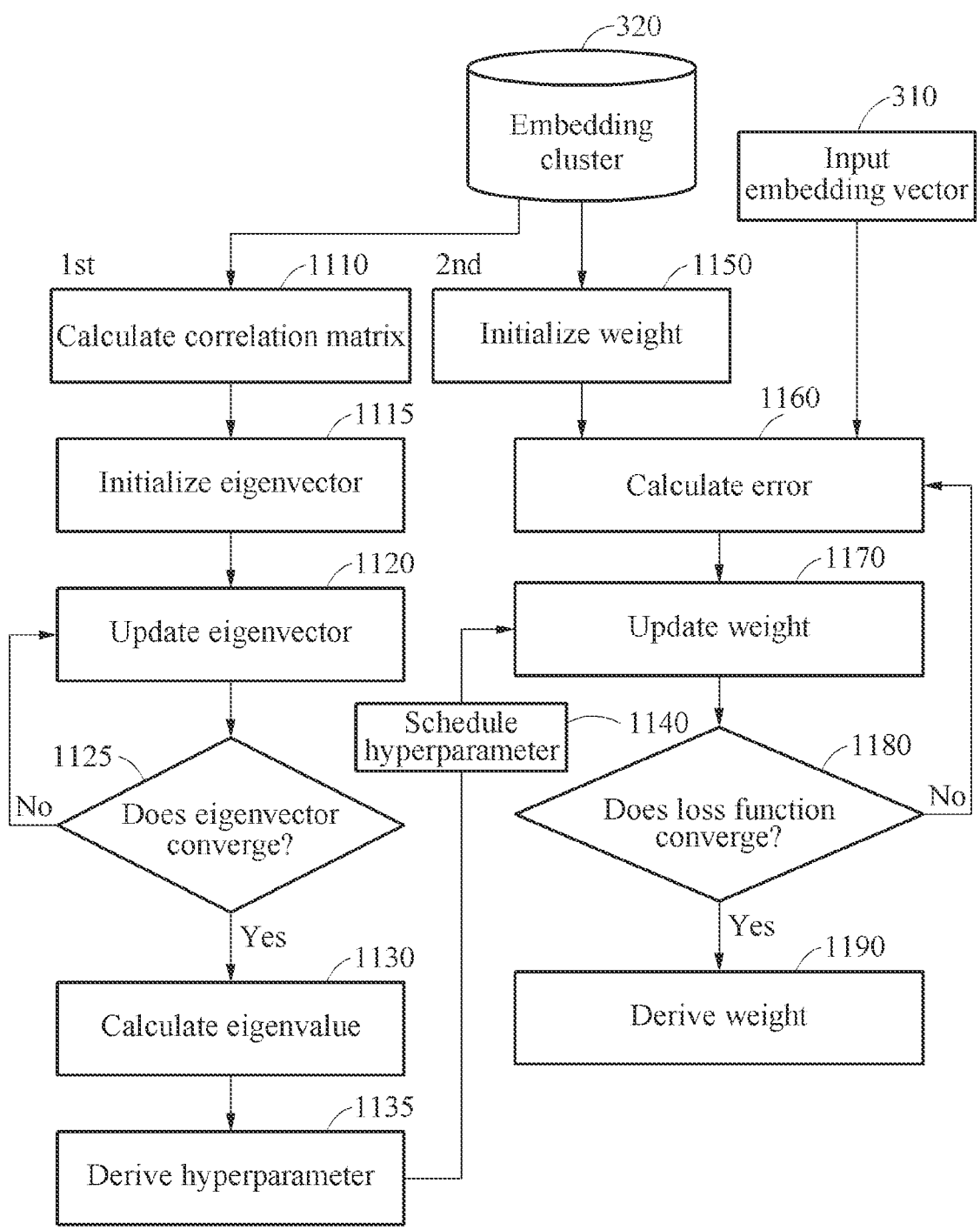
FIG. 11 illustrates an example of a method of classifying input data.

FIG. 11 illustrates an example of a method of classifying input data. The example of FIG. 9 will be further described with reference to FIG. 11, and the method of FIG. 11 may further include a process of automatically deriving a hyperparameter p indicating a step-size. In FIG. 11, a 1st portion including operations 1110 to 1140 (e.g., operations 1110, 1115, 1120, 1125, 1130, 1135, and 1140) may correspond to a process of automatically deriving a hyperparameter, and a 2nd portion including operations 1150 to 1190 (e.g., operations 1150, 1160, 1170, 1180, and 1190) may correspond to a process of deriving a weight as described above with reference to FIG. 9.

The step-size may optimize a reciprocal of a maximum value among eigenvalues of a correlation matrix of a combination target, and sensitivity may be determined based on a system. In an example, a hyperparameter indicating a degree to which a weight is updated, that is, the step-size, may be derived using a power iteration algorithm.

For example, the classification apparatus may obtain an eigenvalue corresponding to the correlation matrix of the combination target using the power iteration algorithm, and may derive a hyperparameter based on the eigenvalue.

For example, the power iteration algorithm may be represented as shown in Equation 10 below, for example.

$$b_{k+1} = \frac{VV^T b_k}{\|VV^T b_k\|}$$

$$\lambda = \frac{b^T VV^T b}{\|b^T b\|}$$

Equation 10

In Equation 10, $$b_{k+1} = \frac{VV^T b_k}{\|VV^T b_k\|}$$

may correspond to an equation for updating an eigenvector, and $$\lambda = \frac{b^T VV^T b}{\|b^T b\|}$$

may correspond to an equation for calculating an eigenvalue.

Hereinafter, an example of performing operations 1110 to 1140 of the 1st portion is described below.

In operation 1110, the classification apparatus may calculate a matrix for obtaining an eigenvalue, that is, a correlation matrix $VV^T$ corresponding to a plurality of enrollment embedding vectors in an embedding cluster to be combined. The classification apparatus may derive a hyperparameter based on the correlation matrix, which will be further described below.

In operation 1115, the classification apparatus may initialize an eigenvector b. The classification apparatus may determine an eigenvector corresponding to the correlation matrix using, for example, the power iteration algorithm. The classification apparatus may iteratively update the eigenvector through Equation 10 until the eigenvector converges.

In operation 1120, the classification apparatus may update the eigenvector by $$b_{k+1} = \frac{VV^T b_k}{\|VV^T b_k\|}$$

of Equation 10. The classification apparatus may iteratively update the eigenvector until the eigenvector converges, and may calculate an eigenvalue corresponding to the updated eigenvector.

In operation 1125, the classification apparatus may determine whether the eigenvector updated in operation 1120 converges. In an example, when the eigenvector is determined not to converge in operation 1125, the classification apparatus may update the eigenvector again in operation 1120.

In another example, when the eigenvector is determined to converge in operation 1125, the classification apparatus may calculate an eigenvalue corresponding to the converging eigenvector in operation 1130. The classification apparatus may calculate an eigenvalue by $$\lambda = \frac{b^T VV^T b}{\|b^T b\|}$$

of Equation 10.

In operation 1135, the classification apparatus may derive a hyperparameter μ based on the eigenvalue calculated in operation 1130.

In operation 1140, the classification apparatus may schedule the hyperparameter derived in operation 1135. For example, the classification apparatus may differently schedule hyperparameters each time weights are iteratively updated in the 2nd portion corresponding to operations 1150 to 1190, based on the hyperparameter derived in operation 1135. The classification apparatus may apply different hyperparameters each time weights are updated, to increase the speed at which a loss function converges and so that the loss function stably converges.

For example, the classification apparatus may apply a value greater than the hyperparameter in an initial stage of weight update so that the loss function may quickly converge. When the number of iterations of weight update increases, the classification apparatus may apply a value less than the hyperparameter, so that the loss function may stably converge to a relatively low value. As described above, a process in which the classification apparatus adjusts a value of a hyperparameter may be referred to as a "scheduling process".

The classification apparatus may generate an embedding vector adaptive to the input embedding vector by updating weights by hyperparameters differently scheduled in operation 1140.

In operation 1150, the classification apparatus may initialize a weight for linear interpolation. For example, the classification apparatus may determine a combination embedding vector by combining enrollment embedding vectors adaptive to the input embedding vector among the plurality of enrollment embedding vectors through linear interpolation, for example, a convex combination. The classification apparatus may update the combination embedding vector by applying the weight to the combination embedding vector.

In operation 1160, the classification apparatus may calculate an error between the updated combination embedding vector and the input embedding vector 310.

In operation 1170, the classification apparatus may update the weight by applying the hyperparameter scheduled in operation 1140 to the error calculated in operation 1160. The classification apparatus may generate an embedding vector adaptive to the input embedding vector based on a loss function between the updated combination embedding vector to which the updated weight is applied and the input embedding vector.

In operation 1180, the classification apparatus may determine whether the loss function between the updated combination embedding vector to which the weight updated in operation 1170 is applied and the input embedding vector converges to a desired value (for example, a first value). The classification apparatus may calculate an error between the updated combination embedding vector and the input embedding vector until the loss function converges to the desired value. In an example, when the loss function is determined not to converge to the first value in operation 1180, the classification apparatus may determine the weight through a process of iteratively updating the weight through operations 1160 to 1180 so that the loss function may converge to the first value.

In another example, when the loss function is determined to converge to the first value in operation 1180, the classification apparatus may derive a weight finally determined so that the loss function may converge in operation 1190.

The classification apparatus may determine a combination embedding vector corresponding to the weight derived in operation 1190 as an embedding vector adaptive to the input embedding vector, and may classify the input data based on a similarity between the input embedding vector and the adaptive embedding vector.

Figure 12:
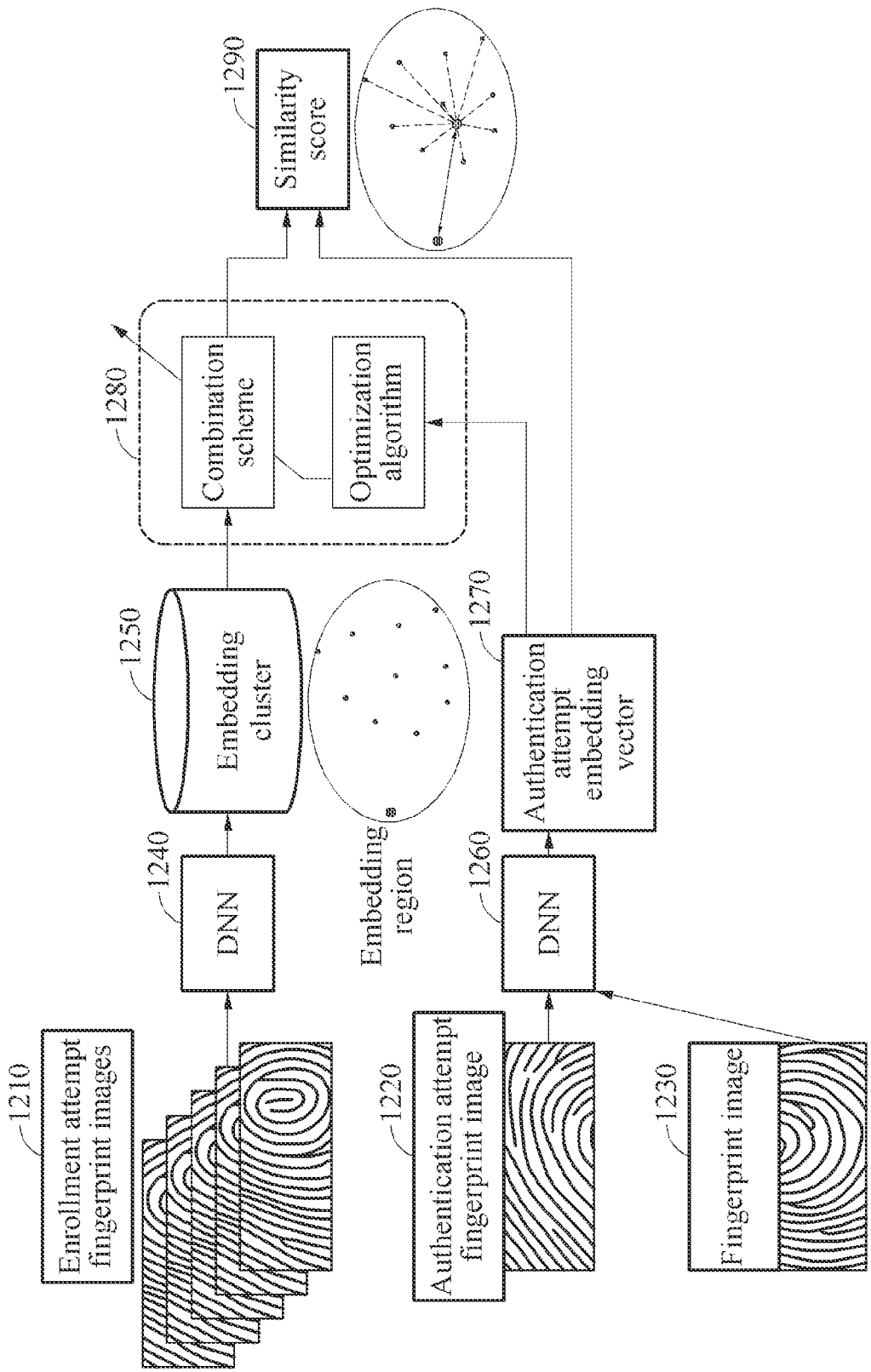
FIG. 12 illustrates an example of a process of classifying whether input data is spoofed.

FIG. 12 illustrates an example of a process of classifying whether input data is spoofed. FIG. 12 illustrates a process in which a classification apparatus calculates a similarity score from a plurality of fingerprint images and determines whether a fingerprint is forged when the fingerprint is recognized.

For example, in an algorithm for distinguishing between a real fingerprint and a fake fingerprint, a real fingerprint that changes depending on environmental and human factors, for example, a recognition device, a fingerprint humidity, or a fingerprint acquisition temperature may need to be distinguished from a fake fingerprint formed of various materials. Thus, to minimize a change factor of the real fingerprint, robustness of detecting a fake fingerprint may be secured based on a similarity to a fingerprint used for enrollment.

In operation 1210, the classification apparatus may receive enrollment attempt fingerprint images. In operation 1240, the classification apparatus may apply the enrollment attempt fingerprint images to a DNN to extract enrollment embedding vectors.

In operation 1250, the classification apparatus may store the enrollment embedding vectors in an embedding cluster.

In operation 1220, the classification apparatus may receive an authentication attempt fingerprint image. In operation 1230, the classification apparatus may receive a fingerprint image.

In operation 1260, the classification apparatus may apply the authentication attempt fingerprint image and the fingerprint image to the DNN. In this example, the authentication attempt fingerprint image and the fingerprint image may be different from each other. The classification apparatus may detect whether the fingerprint image is spoofed, using dynamics between the authentication attempt fingerprint image and the fingerprint image.

In operation 1270, the classification apparatus may extract an authentication attempt embedding vector from the DNN. In this example, the DNN may include, for example, a first neural network and a second neural network respectively corresponding to the authentication attempt fingerprint image and the fingerprint image. For example, the classification apparatus may extract the authentication attempt embedding vector from an intermediate layer of each of the first neural network and the second neural network.

The classification apparatus may detect whether the authentication attempt fingerprint image is spoofed based on a similarity between the enrollment embedding vectors stored in the embedding cluster and the authentication attempt embedding vector.

For example, in operation 1280, the classification apparatus may apply an optimization algorithm to the enrollment embedding vectors stored in the embedding cluster and the authentication attempt embedding vector, and may derive an optimal combination scheme according to a result obtained by applying the optimization algorithm.

In operation 1290, the classification apparatus may calculate a similarity between the authentication attempt embedding vector extracted in operation 1270 and combined according to the optimal combination scheme derived in operation 1280 and an embedding vector adaptive to the authentication attempt embedding vector in the form of a similarity score. The classification apparatus may detect whether the authentication attempt fingerprint image received in operation 1220 is spoofed, based on the similarity score calculated in operation 1290.

Figure 13:
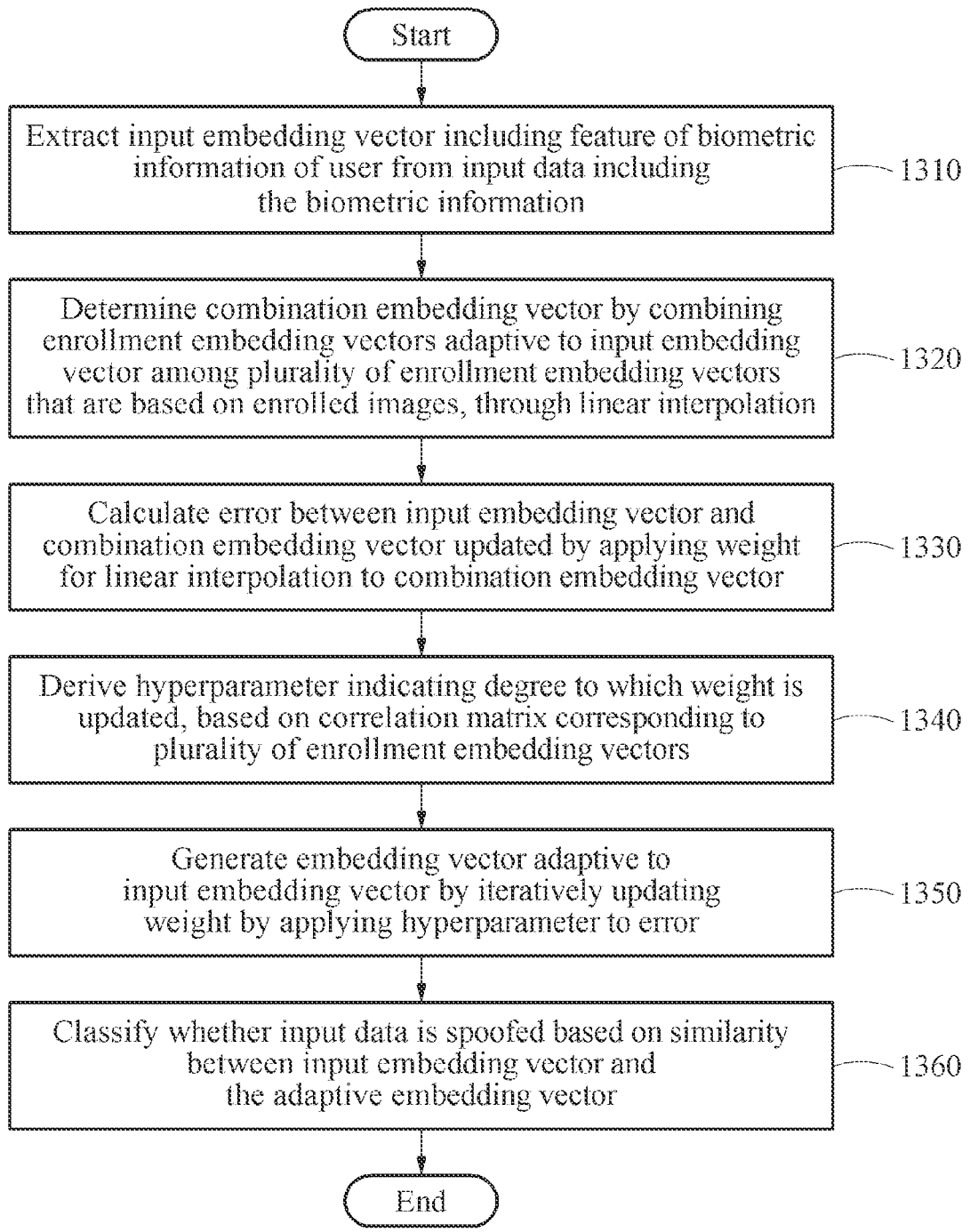
FIG. 13 is a flowchart illustrating an example of a method of classifying whether input data is spoofed.

FIG. 13 illustrates an example of a method of classifying whether input data is spoofed. In the following example, operations may be sequentially performed, but are not necessarily performed in a sequence. For example, the order of operations may be changed, and at least two operations may be performed in parallel.

FIG. 13 illustrates a process in which a classification apparatus classifies whether input data is spoofed through operations 1310 to 1360.

In operation 1310, the classification apparatus may extract an input embedding vector including a feature of biometric information of a user from input data including the biometric information.

In operation 1320, the classification apparatus may determine a combination embedding vector by combining enrollment embedding vectors adaptive to the input embedding vector among a plurality of enrollment embedding vectors included in a cluster based on enrolled images, through linear interpolation.

In operation 1330, the classification apparatus may calculate an error between the input embedding vector and the combination embedding vector that is updated by applying a weight for the linear interpolation to the combination embedding vector.

In operation 1340, the classification apparatus may derive a hyperparameter indicating a degree to which the weight is updated, based on a correlation matrix corresponding to the plurality of enrollment embedding vectors.

In operation 1350, the classification apparatus may generate an embedding vector adaptive to the input embedding vector by iteratively updating the weight by applying the hyperparameter to the error. For example, the classification apparatus may differently schedule hyperparameters each time weights are iteratively updated. The classification apparatus may generate an embedding vector adaptive to the input embedding vector by updating the weights by the differently scheduled hyperparameters.

In operation 1360, the classification apparatus may classify whether the input data is spoofed based on a similarity between the input embedding vector and the adaptive embedding vector.

Figure 14:
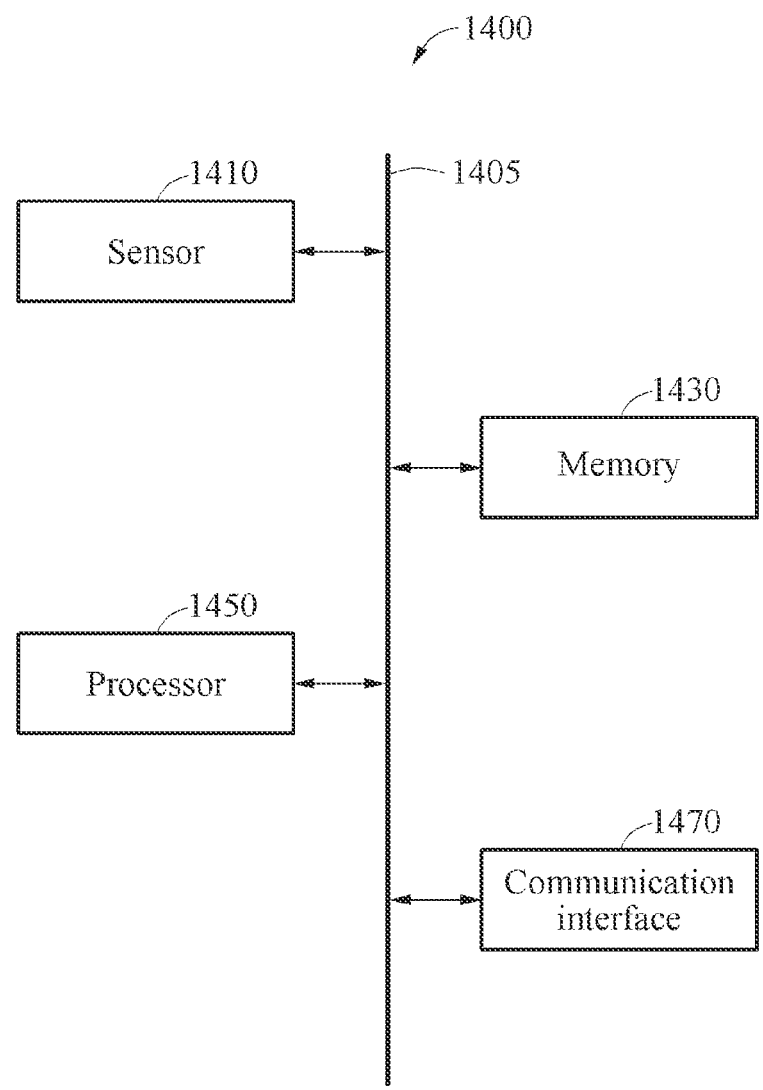
FIG. 14 illustrates an example of an apparatus for classifying input data.

FIG. 14 illustrates an example of an apparatus for classifying input data. Referring to FIG. 14, an apparatus 1400 (hereinafter, referred to as a "classification apparatus" 1400) for classifying input data may include a sensor 1410 (e.g., one or more sensors), a memory 1430 (e.g., one or more memories), a processor 1450 (e.g., one or more processors), and a communication interface 1470. The sensor 1410, the memory 1430, the processor 1450, and the communication interface 1470 may be connected to each other via a communication bus 1405. The classification apparatus 1400 may be the classification apparatus 100 of FIG. 1, according to non-limiting examples.

The sensor 1410 may sense input data including biometric information of a user. The input data may be, for example, image data or audio data. The sensor 1410 may include, for example, any one or any combination of an ultrasonic fingerprint sensor, an optical fingerprint sensor, an electrostatic fingerprint sensor, a depth sensor, an image sensor, and a sound sensor, but is not limited thereto. The biometric information may include, for example, one of a fingerprint, an iris, a face and voice of a user, but is not limited thereto. The sensor 1410 may be or include the sensor 110 of FIG. 1, according to non-limiting examples.

The memory 1430 may store a cluster including a plurality of enrollment embedding vectors that are based on enrollment data. The memory 1430 may store biometric information of a user sensed by sensors 1410. In addition, the memory 1430 may store an adaptive embedding vector determined by the processor 1450 and/or input data classified by the processor 1450.

The memory 1430 may store a variety of information generated in a processing process of the processor 1450 described above. In addition, the memory 1430 may store a variety of data and programs. The memory 1430 may include, for example, a volatile memory or a non-volatile memory. The memory 1430 may include a large-capacity storage medium such as a hard disk to store a variety of data.

The processor 1450 may extract an input embedding vector including a feature of the biometric information from the input data sensed by the sensor 1410. The processor 1450 may determine an embedding vector adaptive to the input embedding vector based on a combination of the plurality of enrollment embedding vectors. The processor 1450 may classify the input data based on a similarity between the input embedding vector and the adaptive embedding vector. However, the operation of the processor 1450 is not limited to the above description, and the processor 1450 may also perform the above-described operation together with at least one of the operations described above with reference to FIGS. 1 to 13.

The processor 1450 may be a hardware-implemented neural network or classification apparatus having a circuit having a physical structure to perform desired operations. For example, the desired operations may include instructions or codes included in a program. The hardware-implemented classification apparatus may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), or a neural processing unit (NPU).

The processor 1450 may execute the program and may control the classification apparatus 1400. Code of the program executed by the processor 1450 may be stored in the memory 1430.

In an example, the communication interface 1470 may output a classification result (for example, whether the input data is spoofed) obtained by the processor 1450 classifying the input data to the outside of the classification apparatus 1400. In another example, the communication interface 1470 may transmit the classification result of the processor 1450 together with the input data to another apparatus. In this example, the biometric information and information regarding whether the biometric information is spoofed may be matched with each other.

Depending on examples, the communication interface 1470 may receive input data (for example, image data) including biometric information of a user from the outside of the classification apparatus 1400 and may transmit the input data to the processor 1450.

The classification apparatus 1400 may further include an output device. The output device may output the classification result of the processor 1450. The output device may include, for example, a display, an alarm, a speaker, or other various types of output devices capable of notifying a user of a result of classification of input data. The communication interface 1470 may include the output device, according to non-limiting examples.

The classification apparatuses, sensors, enrollment fingerprint DBs, apparatuses, sensors, memories, processors, communication interfaces, communication buses, classification apparatus 100, sensor 110, enrollment fingerprint DB 120, apparatus 1400, sensor 1410, memory 1430, processor 1450, communication interface 1470, communication bus 1405, and other apparatuses, devices, units, modules, and components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with input data classification, the method comprising:
   extracting an input embedding vector including a feature of biometric information of a user from input data including the biometric information;
   determining an adaptive embedding vector adaptive to the input embedding vector, wherein a value of the adaptive embedding vector is determined by combining a plurality of enrollment embedding vectors that are based on enrollment data; and
   classifying the input data based on a similarity between the input embedding vector and the adaptive embedding vector.

2. The method of claim 1, wherein the determining of the adaptive embedding vector comprises:
   determining a combination embedding vector by combining enrollment embedding vectors adaptive to the input embedding vector among the plurality of enrollment embedding vectors; and
   generating the adaptive embedding vector by updating the combination embedding vector based on a loss function between the combination embedding vector and the input embedding vector.

3. The method of claim 2, wherein the generating of the adaptive embedding vector comprises generating the adaptive embedding vector by iteratively updating the combination embedding vector so that the loss function converges to a first value.

4. The method of claim 2, wherein
   the determining of the combination embedding vector comprises determining the combination embedding vector by combining the enrollment embedding vectors adaptive to the input embedding vector among the plurality of enrollment embedding vectors, through linear interpolation, and
   the generating of the adaptive embedding vector comprises:
   updating the combination embedding vector by applying a weight for the linear interpolation to the combination embedding vector; and
   generating the adaptive embedding vector by updating the weight based on an error between the updated combination embedding vector and the input embedding vector.

5. The method of claim 4, further comprising:
receiving a hyperparameter indicating a degree to which the weight is updated,
wherein the generating of the adaptive embedding vector comprises:
updating the weight by applying the hyperparameter to the error; and
generating the adaptive embedding vector based on a loss function between the input embedding vector and the updated combination embedding vector to which the updated weight is applied.

6. The method of claim 5, wherein the generating of the adaptive embedding vector comprises generating the adaptive embedding vector by iteratively updating the weight so that the loss function between the input embedding vector and the updated combination embedding vector to which the updated weight is applied converges to a first value.

7. The method of claim 4, further comprising:
deriving a hyperparameter indicating a degree to which the weight is updated, using a power iteration algorithm,
wherein the generating of the adaptive embedding vector comprises generating the adaptive embedding vector by iteratively updating the weight by applying the hyperparameter to the error.

8. The method of claim 7, wherein the deriving of the hyperparameter comprises:
determining a correlation matrix corresponding to the plurality of enrollment embedding vectors; and
deriving the hyperparameter based on the correlation matrix.

9. The method of claim 8, wherein the deriving of the hyperparameter based on the correlation matrix comprises:
determining an eigenvalue corresponding to the correlation matrix using the power iteration algorithm; and
deriving the hyperparameter based on the eigenvalue.

10. The method of claim 9, wherein the determining of the eigenvalue comprises:
determining an eigenvector corresponding to the correlation matrix using the power iteration algorithm;
iteratively updating the eigenvector until the eigenvector converges; and
determining the eigenvalue corresponding to the updated eigenvector.

11. The method of claim 7, wherein the generating of the adaptive embedding vector by iteratively updating the weight comprises:
differently scheduling the hyperparameter each time the weight is iteratively updated; and
generating the adaptive embedding vector by updating the weight by differently scheduled hyperparameters.

12. The method of claim 1, wherein the classifying of the input data comprises either one or both of:
authenticating the input data based on the similarity; and
determining whether the input data is spoofed based on the similarity.

13. A non-transitory computer-readable storage medium storing instructions that, when executed by a processor, configure the processor to perform the method of claim 1.

14. A processor-implemented method with input data classification, the method comprising:
extracting an input embedding vector including a feature of biometric information of a user from input data including the biometric information;
determining a combination embedding vector by combining enrollment embedding vectors adaptive to the input embedding vector among a plurality of enrollment embedding vectors included in a cluster based on enrolled images, through linear interpolation;
determining an error between the input embedding vector and the combination embedding vector that is updated by applying a weight for the linear interpolation to the combination embedding vector;
deriving a hyperparameter indicating a degree to which the weight is updated, based on a correlation matrix corresponding to the plurality of enrollment embedding vectors;
generating an embedding vector adaptive to the input embedding vector by iteratively updating the weight by applying the hyperparameter to the error; and
classifying whether the input data is spoofed based on a similarity between the input embedding vector and the adaptive embedding vector.

15. The method of claim 14, wherein the generating of the adaptive embedding vector by iteratively updating the weight comprises:
differently scheduling the hyperparameter for each iteration at which the weight is iteratively updated; and
generating the adaptive embedding vector by updating the weight by differently scheduled hyperparameters.

16. An apparatus with input data classification, the apparatus comprising:
a sensor configured to capture input data including biometric information of a user;
a memory configured to store a cluster including a plurality of enrollment embedding vectors that are based on enrollment data; and
a processor configured to:
extract an input embedding vector including a feature of the biometric information from the input data;
determine an adaptive embedding vector adaptive to the input embedding vector, wherein a value of the adaptive embedding vector is determined by combining the plurality of enrollment embedding vectors; and
classify the input data based on a similarity between the input embedding vector and the adaptive embedding vector.

17. The apparatus of claim 16, wherein, for the determining of the adaptive embedding vector, the processor is configured to:
determine a combination embedding vector by combining enrollment embedding vectors adaptive to the input embedding vector among the plurality of enrollment embedding vectors; and
generate the adaptive embedding vector by updating the combination embedding vector based on a loss function between the combination embedding vector and the input embedding vector.

18. The apparatus of claim 17, wherein, for the generating of the adaptive embedding vector, the processor is configured to generate the adaptive embedding vector by iteratively updating the combination embedding vector so that the loss function converges to a first value.

19. The apparatus of claim 17, wherein the processor is configured to:
for the determining of the combination embedding vector, determine the combination embedding vector by combining the enrollment embedding vectors adaptive to the input embedding vector among the plurality of enrollment embedding vectors, through linear interpolation; and
for the generating of the adaptive embedding vector, update the combination embedding vector by applying a weight for the linear interpolation to the combination embedding vector; and generate the adaptive embedding vector by updating the weight based on an error between the updated combination embedding vector and the input embedding vector.

20. The apparatus of claim 19, wherein the processor is configured to:

derive a hyperparameter indicating a degree to which the weight is updated, based on a correlation matrix corresponding to the plurality of enrollment embedding vectors; and for the generating of the adaptive embedding vector, generate the adaptive embedding vector by iteratively updating the weight by applying the hyperparameter to the error.

21. A processor-implemented method with input data classification, the method comprising:

extracting an input embedding vector from input data including biometric information;

determining a loss between the input embedding vector and a combination embedding vector generated by combining a plurality of enrollment embedding vectors;

generating an adaptive embedding vector by updating the combination embedding vector until the loss converges to a predetermined value; and classifying the input data based on a similarity between the input embedding vector and the adaptive embedding vector.

22. The method of claim 21, wherein the combination embedding vector is a combination of the enrollment embedding vectors among a plurality of combinations of the enrollment embedding vectors.

23. The method of claim 22, wherein the adaptive embedding vector is the updated combination vector for which the loss converges to the predetermined value.

24. The method of claim 21, further comprising obtaining the biometric information using one or more sensors.

25. The method of claim 21, further comprising controlling access to one or more functions of an electronic apparatus based on a result of the classifying.

* * * * *